(12) United States Patent
Ashikaga

(10) Patent No.: US 8,391,607 B2
(45) Date of Patent: Mar. 5, 2013

(54) IMAGE PROCESSOR AND COMPUTER READABLE MEDIUM

(75) Inventor: Hideaki Ashikaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1111 days.

(21) Appl. No.: 12/263,055

(22) Filed: Oct. 31, 2008

(65) Prior Publication Data
US 2009/0257653 A1   Oct. 15, 2009

(30) Foreign Application Priority Data
Apr. 14, 2008   (JP) ................. 2008-104340

(51) Int. Cl.
G06K 9/46 (2006.01)
G06K 9/66 (2006.01)

(52) U.S. Cl. ............. 382/190; 382/176; 382/218

(58) Field of Classification Search .......... 345/582; 382/190, 218
See application file for complete search history.

(56) References Cited

U.S. PATENT DOCUMENTS

| | | | | |
|---|---|---|---|---|
| 5,452,105 A * | 9/1995 | Tamagaki et al. | ............. | 358/453 |
| 5,699,453 A * | 12/1997 | Ozaki | ............. | 382/176 |
| 5,748,805 A * | 5/1998 | Withgott et al. | ............. | 382/306 |
| 6,353,840 B2 * | 3/2002 | Saito et al. | ............. | 715/202 |
| 6,507,415 B1 * | 1/2003 | Toyoda et al. | ............. | 358/450 |
| 7,194,144 B1 | 3/2007 | Sakai et al. | | |
| 7,548,916 B2 * | 6/2009 | Kaneda | ............. | 1/1 |
| 7,627,136 B2 * | 12/2009 | Hara | ............. | 382/100 |
| 8,224,089 B2 * | 7/2012 | Nielsen | ............. | 382/173 |
| 2003/0169924 A1 | 9/2003 | Nishiyama et al. | | |
| 2004/0223648 A1 | 11/2004 | Hoene et al. | | |
| 2006/0120627 A1 * | 6/2006 | Shiiyama | ............. | 382/305 |
| 2006/0146062 A1 * | 7/2006 | Kee et al. | ............. | 345/582 |
| 2006/0159347 A1 | 7/2006 | Derks et al. | | |
| 2006/0218496 A1 | 9/2006 | Kunori | | |
| 2008/0181505 A1 * | 7/2008 | Wu et al. | ............. | 382/190 |
| 2009/0257653 A1 * | 10/2009 | Ashikaga | ............. | 382/173 |
| 2011/0043869 A1 * | 2/2011 | Okajo | ............. | 358/474 |

FOREIGN PATENT DOCUMENTS

CN   1838061 A   9/2006

(Continued)

OTHER PUBLICATIONS

Feb. 23, 2010 Office Action cited in Japanese Patent Application No. 2008-104340 (with translation).
Mar. 5, 2010 Office Action issued in Australian Patent Application No. 2008246275.

(Continued)

Primary Examiner — Gregory M Desire
(74) Attorney, Agent, or Firm — Oliff & Berridge, PLC

(57) ABSTRACT

An image processor includes a partial image extracting unit, a sequencing unit and a difference extracting unit. The partial image extracting unit extracts first partial images from a first image, and extracts second partial images from a second image. The sequencing unit determines an order of the extracted first partial images in accordance with positions of the first partial images in the first image, and determines an order of the extracted second partial images in accordance with positions of second partial images in the second image. And the difference extracting unit that compares each first partial image with the corresponding second partial image in accordance with the order of the first partial images and the order of the second partial images, and extracts a difference based on the comparison between the first image and the second image.

13 Claims, 18 Drawing Sheets

FOREIGN PATENT DOCUMENTS

| | | |
|---|---|---|
| JP | A-1-292586 | 11/1989 |
| JP | A-11-259597 | 9/1999 |
| JP | A-2000-278514 | 10/2000 |
| JP | A-2003-331217 | 11/2003 |
| JP | A 2004-213230 | 7/2004 |
| JP | A 2004-287682 | 10/2004 |
| JP | A 2004-341914 | 12/2004 |

OTHER PUBLICATIONS

Chinese Office Action issued Jun. 12, 2012 in Chinese Application No. 200910000468.X with English translation.

Korean Office Action issued on May 15, 2012 in Korean Patent Application No. 10-2008-0129256 (with translation).

\* cited by examiner

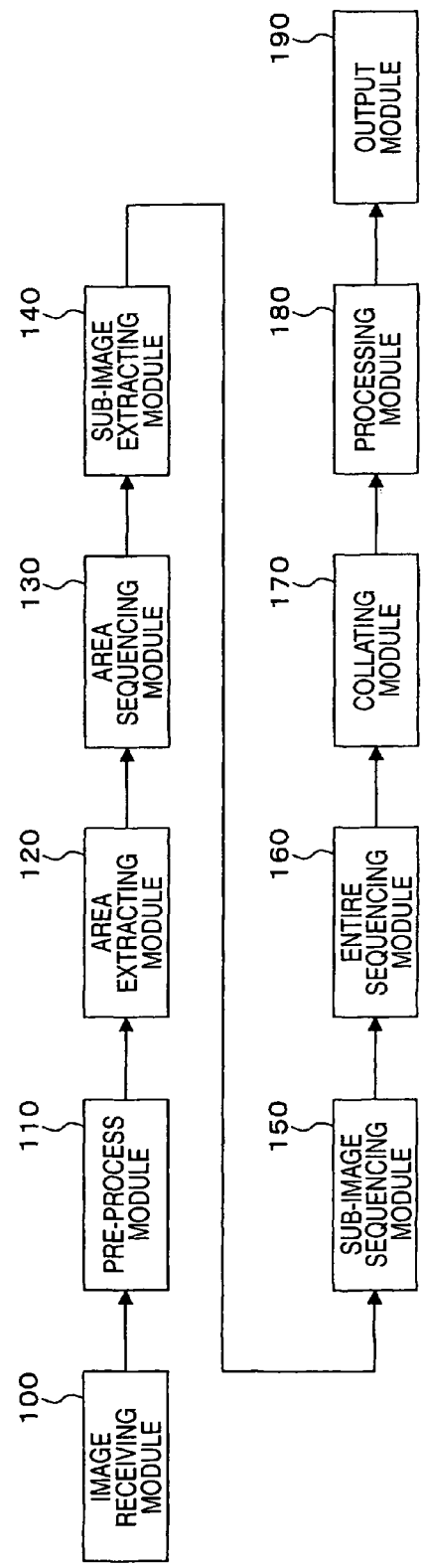

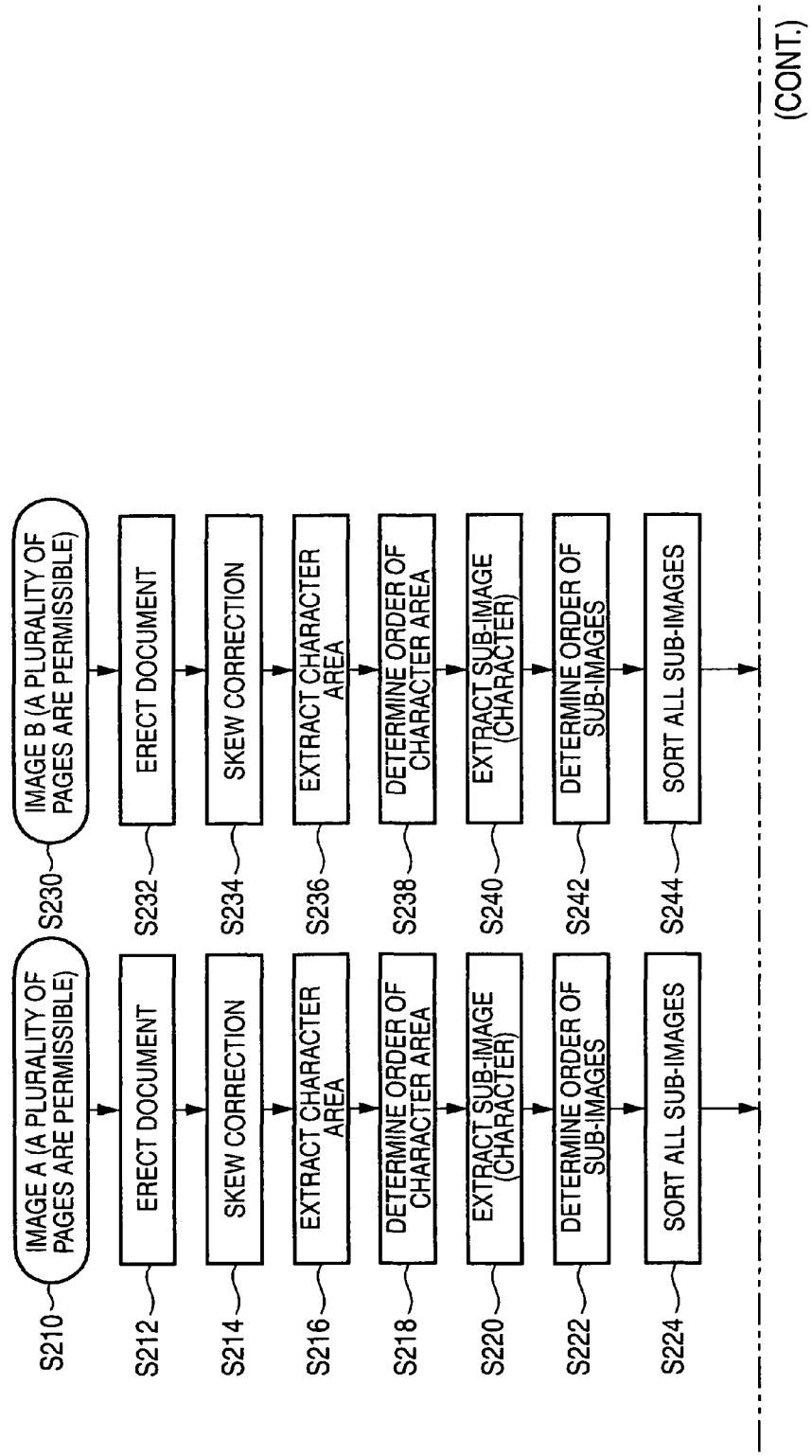

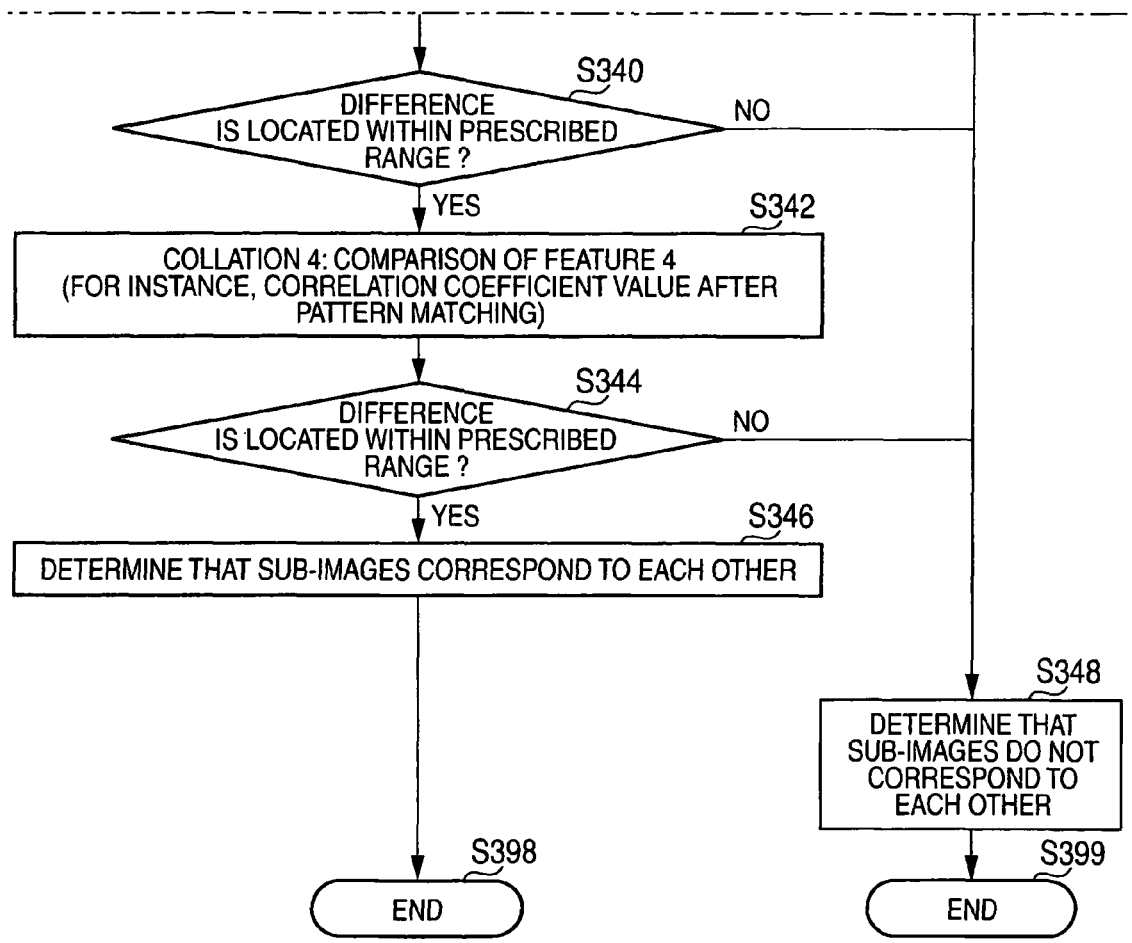

FIG. 15
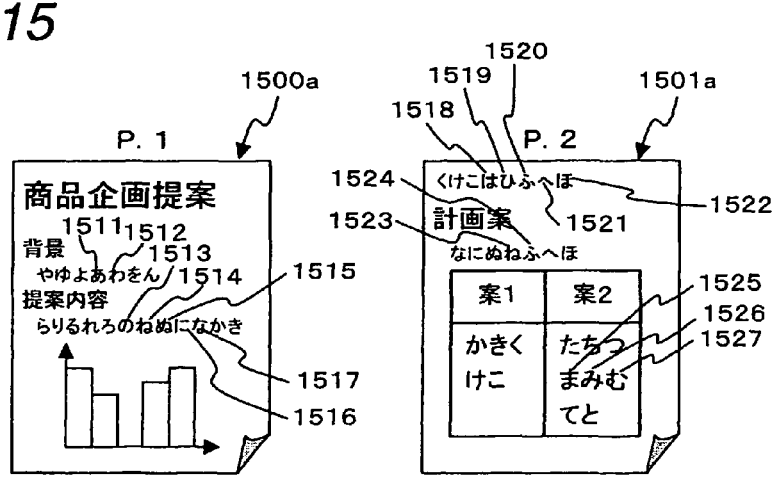
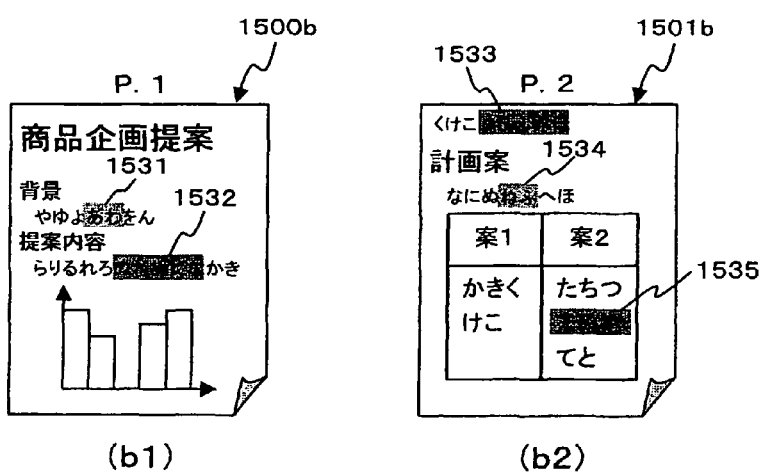
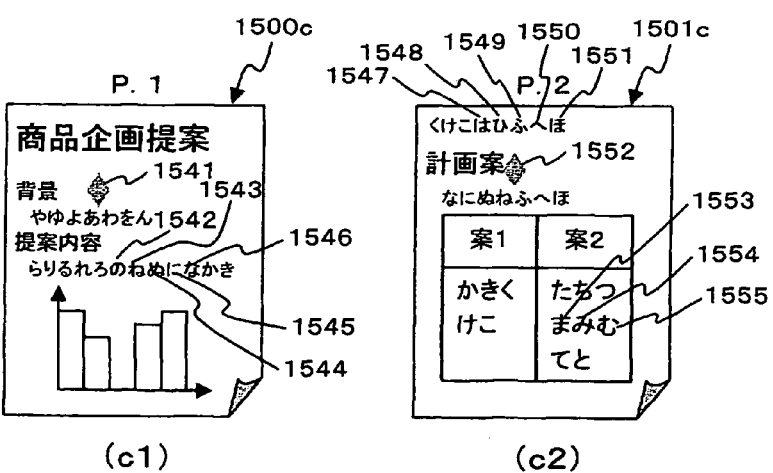

IMAGE PROCESSOR AND COMPUTER READABLE MEDIUM

CROSS-REFERENCE TO RELATED APPLICATIONS

This application is based on and claims priority under 35 USC 119 from Japanese Patent Application No. 2008-104340 filed Apr. 14, 2008.

BACKGROUND

1. Technical Field

The present invention relates to an image processor, and a computer readable medium.

2. Related Art

There are needs that a changed portion of a document by such as an addition or a deletion is made clear, for instance, when detecting whether or not a user add a postscript in handwriting on a document using paper as a medium or when investigating whether or not a security document is altered. To meet the needs, a process is performed that the text and a paper document (a document to be compared with the text, that is, a document in which a postscript may be possibly add) are read by a scanner, and both images are compared with each other to extract a difference.

SUMMARY

According to an aspect of the invention, an image processor includes a partial image extracting unit, a sequencing unit and a difference extracting unit. The partial image extracting unit extracts first partial images from a first image, and extracts second partial images from a second image The sequencing unit determines an order of the extracted first partial images in accordance with positions of the first partial images in the first image, and determines an order of the second extracted partial images in accordance with positions of second partial images in the second image. And the difference extracting unit compares each first partial image with the corresponding second partial image in accordance with the order of the first partial images and the order of the second partial images, and extracts a difference based on the comparison between the first image and the second image.

BRIEF DESCRIPTION OF THE DRAWINGS

Exemplary embodiment(s) of the present invention will be described in detail based on the following figures, wherein:

FIG. 1 is a conceptual module block diagram of a structural example of an exemplary embodiment;

FIG. 10 is an explanatory view showing a process example of the case 2 according to the exemplary embodiment;

FIG. 15 is an explanatory view showing a process example of a case 2 according to the exemplary embodiment.

DETAILED DESCRIPTION

Figure 2:
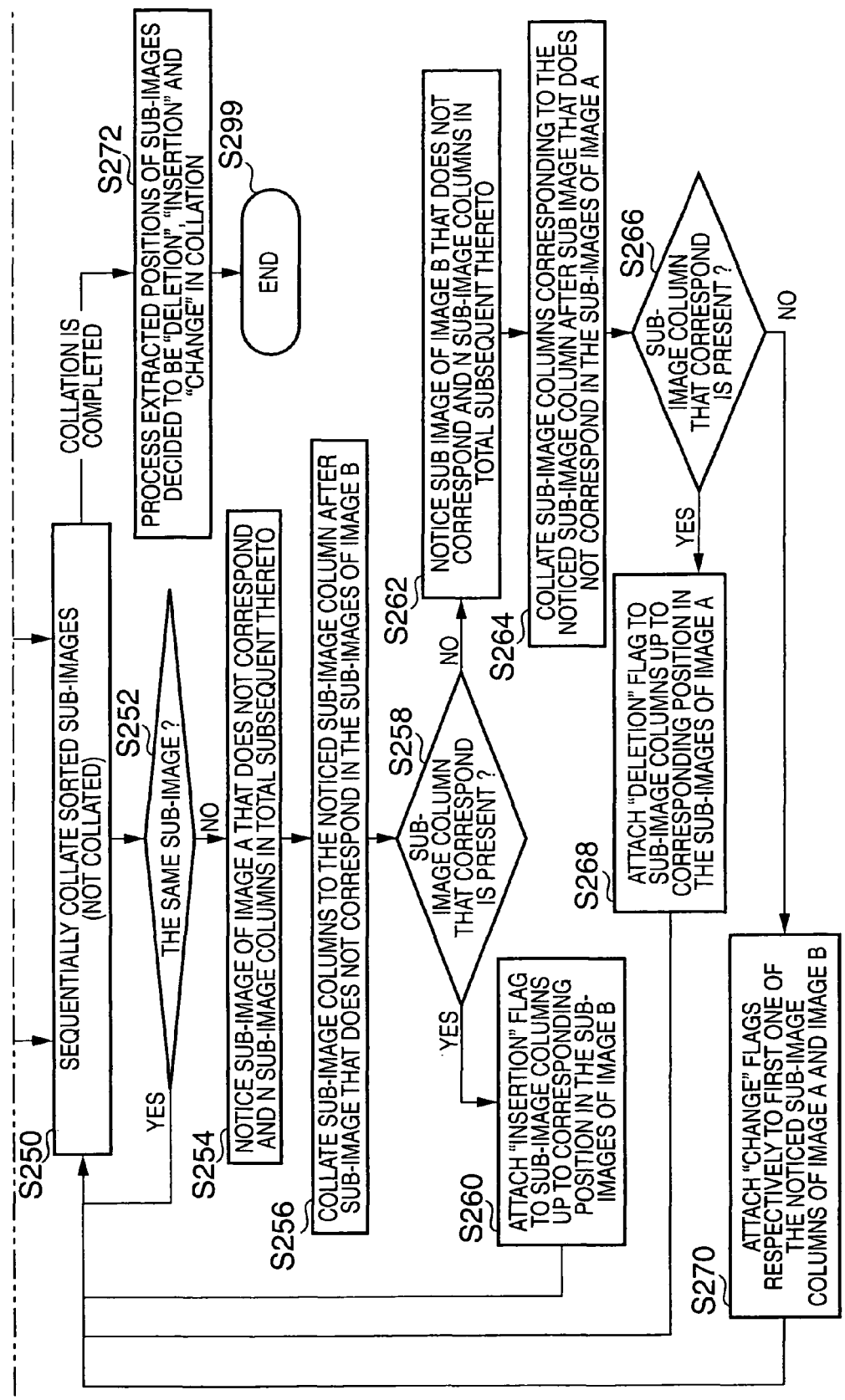
FIG. 2 is a flowchart showing a process example according to the exemplary embodiment.

Now, referring to the drawings, an exemplary embodiment for realizing the present invention will be described below.

FIG. 1 shows a conceptual module block diagram of a structural example of this exemplary embodiment.

A module ordinarily indicates logically separable parts of software (computer program), hardware or the like. Accordingly, the module in this exemplary embodiment indicates not only the module in the computer program, but also the module in a hardware structure. Therefore, this exemplary embodiment also explains the computer program, a system and a method. In this case, for the convenience of explanation, "store", "cause to store" and words equivalent to them are used. When this exemplary embodiment is the computer program, these words indicate a meaning to cause a storage device to store or to control the storage device to store. Further, the module substantially corresponds to a function on a one-to-one basis. However, in amounting, one module may be formed with one program, or a plurality of modules may be formed with one program. On the contrary, the one module may be formed with a plurality of programs. Further, the plurality of modules may be executed by one computer or one module may be executed by a plurality of computers in a distributed or parallel environment. Other modules may be included in the one module. A "connection" includes a logical connection (a transmission and reception of data, an instruction, a reference relation between data or the like) as well as a physical connection, hereinafter.

Further, a system or a device includes not only a structure obtained by connecting a plurality of computers, hardware, devices etc. by a communication unit such as a network (including a communication connection on a one-to-one basis) but also a structure realized by one computer, hardware, a device or the like. The "device" and the "system" are used as words having the same meaning. Further, a word of prescribed includes not only a meaning of predetermined, but also a meaning of depending on a status and a state at that time or a meaning of depending on a status and a state up to that time.

Plural images may allow comparing. Now, two images (including one page or two pages or more) are provided, one image to be compared (what is called an original image, referred as an "image A", hereinafter) and the other image to be compared (an image to which a change may be possibly applied, referred as an "image B", hereinafter) are exemplified and described. Further, here, as the image, a document is exemplified, however, an image including a partial image (referred as a sub-image, hereinafter) may be used. As the partial image, an image of a Japanese character is exemplified. However, another character such as alphabet, simplified and traditional Chinese, Korean alphabet may be applied. And, the partial image does not need to be limited to the character and may be a part of the character, on the contrary, a plurality of characters or a figure. Further, as the contents of the image, a document used for a business, a pamphlet for advertisement and publicity or the like may be applied.

This exemplary embodiment includes, as shown in FIG. 1, an image receiving module 100, a pre-process module 110, an area extracting module 120, an area sequencing module 130, a sub-image extracting module 140, a sub-image sequencing module 150, an entire sequencing module 160, a collating module 170, a processing module 180 and an output module 190.

The image receiving module 100 is connected to the pre-process module 110 to receive the image and transmit the image to the pre-process module 110. "To receive the image" includes "to read the image by a scanner", "to receive the image by a facsimile", "to read the image form a data base" or the like. The image may be composed of one sheet or a plurality of sheets. Further, the image to be received does not necessarily need to be an image of a paper medium, and an electronic document (that is, an electronic document before printed, for instance, an electronic document mainly including a text created by a document creating software) may be received, and then, an image for printing may be formed.

The pre-process module 110 is connected to the image receiving module 100 and the area extracting module 120 to receive the image from the image receiving module 100, apply a pre-process to the image and transmit the image to which the pre-process is applied to the area extracting module 120. As the pre-process, the pre-process includes i) to convert the image to a binary image, when the received image is a multi-valued image (including a color image), ii) to apply an erecting process to the image, iii) to carry out a skew correction, to remove noise, etc. The erecting process indicates to convert the direction of the image to an ordinary direction in which the image can be read. For instance, a character recognizing processes are performed while the image is rotated to four directions, to rotate the image to one of the directions in which a recognition rate is the highest. An existing technique may be used. Further, the skew correction means to correct an inclination. For instance, when the image is read by the scanner, the inclination arises. So, the inclination of a straight line is obtained by a huff conversion relative to the image to rotate the image such that the inclination of the straight line is vertical or horizontal. An known technique may be employed.

The area extracting module 120 is connected to the pre-process module 110 and the area sequencing module 130 to receive the image from the pre-process module 110, extract an area from the image (for instance, a character area, a graphic area, an area of a photograph) and deliver information about the area to the area sequencing module 130. For instance, a part in which a character is written in the image is extracted as a block (a rectangular area). A known technique such as a separating technique of the character and the image or a character area extracting technique as a pre-process in the character recognizing process may be employed.

The area sequencing module 130 is connected to the area extracting module 120 and the sub-image extracting module 140 to receive the information about the area from the area extracting module 120, determine an order of targeted areas and transmit information of the ordered areas to the sub-image extracting module 140. For instance, in the case of a transversely written document (when the characters are written from a left to a right), the order of character areas is determined firstly from the area located on the image. Then, when the character areas are located within a prescribed range as a vertical position and arranged transversely, the order thereof is determined from the character area located in the left side to the character area located in the right side. Further, in the case of a lengthwise written document, the order the character areas is determined from the character area located in the right side of the image. Then, when the character areas are located within a prescribed range as a transverse position and arranged lengthwise, the order thereof is determined from an upper part to a lower part. In this case, the area sequencing module 130 may decide whether the document is the transversely written document or the lengthwise written document to determine the order of the character areas. That is, the order of the character areas is determined so as to have an ordinary reading order, however, the order of the character areas do not necessarily need to be determined in a precise reading order. However, between the images to be compared, the order of the areas is determined in accordance with the same ordering rule.

The sub-image extracting module 140 is connected to the area sequencing module 130 and the sub-image sequencing module 150 to receive the information about the ordered areas from the area sequencing module 130, extract sub-images from the image within the areas and transmit information about the sub-images to the sub-image sequencing module 150. For instance, the sub-images of about one character unit are extracted. At this time, extracted pages and positions are stored. A known technique such as a character extracting technique as a pre-process in the character recognizing process may be employed.

The sub-image sequencing module 150 is connected to the sub-image extracting module 140 and the entire sequencing module 160 to i) determine an order of the sub-images extracted by the sub-image extracting module 140 in accordance with the positions of the sub-images in the image and ii) transmit information of the ordered sub-images to the entire sequencing module 160. For instance, in the case of the transversely written document, the order of the sub-images is determined firstly from the sub-image located on the image. Then, when the sub-images are located within a prescribed range as a vertical position and arranged transversely, the order thereof are ordered from the sub-image located in the left side to the sub-image located in the right side. Further, in the case of the lengthwise written document, the order of the sub-images is ordered from the sub-image located in the right side of the image. Then, when the sub-images are located within a prescribed range as a transverse position and arranged lengthwise, the order thereof is determined from an upper part to a lower part. In this case, the sub-image sequencing module 150 may decide whether the document is the transversely written document or the lengthwise written document to order the sub-images. That is, the order of the sub-images is determined so as to have an ordinary reading order, however, the order thereof do not necessarily need to be ordered in a precise reading order. However, between the images to be compared, the order of the sub-images is determined in accordance with the same sequencing rule.

The entire sequencing module 160 is connected to the sub-image sequencing module 150 and the collating module 170 to i) receive the information of the sub-images ordered in the areas, ii) determines an order of the sub-images throughout the entire part of the image and iii) transmit information of the ordered sub-images to the collating module 170. Namely, when there are plural character areas in the image, the sub-images are ordered throughout the plural character areas each ordered by the area sequencing module 130. When the image has a plurality of pages, the sub-images are ordered throughout the pages. The sub-images located after the second page are ordered so as to follow the sub-image located in a preceding page. That is, a sorting process (a sequencing process) is carried out in three stages. The order of the sorting process includes the order of the pages as a first priority, the order of the character areas in the pages as a second priority and the order of the sub-images in the character areas as a third priority.

Processes from the pre-process module 110 to the entire sequencing module 160 are carried out respectively to the image A and the image B. In this case, after each module carrying out the process to the image A, the module is not required to carry out the process to the image B. The processes to the image A may be sequentially carried out by the pre-process module 110 to the entire sequencing module 160 and the entire sequencing module 160 may store a result thereof in a storage device, and then, the processes to the image B may be carried out. Namely, the storage device stores the information of the sub-images in the image A ordered in accordance with the positions of the sub-images extracted from the image A. Further, when the image A has the plurality of pages, the storage device stores the information of the sub-images ordered throughout the plurality of pages. Further, to the image A, the processes may be carried out that includes a process for extracting features of the sub-images by the collating module 170. Then, the storage device may store the order of the sub-images and the features of the sub-images as the information relating to the sub-images. When the storage device is allowed to store the information relating to the sub-images, if plural images to be compared are present, a process to the image A may be completed at a time.

The collating module 170 is connected to the entire sequencing module 160 and the processing module 180 to compare the corresponding sub-images between the image A and the image B in accordance with the order of the sub-images ordered by the entire sequencing module 160, extract a difference between the image A and the image B and transmit information of the extracted difference to the processing module 180. Further, the collating module 170 uses the features of the sub-images in the image A and the features of the sub-images in the image B to compare the individual sub-images. The comparison of the sub-images may be performed in accordance with the order of the sub-images determined by the entire sequencing module 160.

Further, when the information relating to the sub-images in the image A is stored in the storage device by the entire sequencing module 160, the collating module 170 compares the corresponding sub-images between the image A and the image B in accordance with the information relating to the sub-images in the storage device and the order of the sub-images in the image B determined by the entire sequencing module 160. And the collating module 170 extracts the difference between the image A and the image B. Further, the collating module 170 may use the features of the sub-images in the image A stored in the storage device and the features of the sub-images in the image B to compare the individual sub-images. The comparison of the sub-images may be performed in accordance with the order of the sub-images in the image A stored in the storage device and the order of the sub-images in the image B determined by the entire sequencing module 160.

Further, as the extracted difference, for instance, the deletion, the insertion and the change of the sub-images are exemplified. In this case, the sub-images of the image A and the image B are sequentially compared with each other. When the sub-images do not correspond to each other, the sub-image of the image A is fixed to search the sub-images of the image B. When there is the sub-image corresponding to the sub-image of the image A, the difference is decided to be the "insertion". When the sub-image of the image B is fixed to search the sub-images of the image A, if the sub-image corresponding to the sub-image of the image B, the difference is decided to be the "deletion". When the difference does not correspond to both the above-described examples, the difference may be decided to be the "change". Further, when the sub-images do not correspond to each other, a plurality of continuous sub-images may be collectively searched.

The processing module 180 is connected to the collating module 170 and the output module 190 to process the image A or the image B in accordance with the position of the sub-image having the difference extracted by the collating module 170 and transmit the processed image to the output module 190. For instance, the image A or the image B corresponding to the position of the sub-image decided to be different by the collating module 170 is processed so that the difference can be discriminated. For the processing operation, a mark such as a "symbol (for instance, ♦, etc,) may be attached, the character may be made to be bold, a color may be changed, a background color may be changed or the like. Further, the image itself may be processed or an annotation may be attached to the image. Further, when the image is presented on a display, the corresponding sub-image may be blinked.

The output module 190 is connected to the processing module 180 to receive the processed image from the processing module 180 and output the image. "To output the image" includes "to print the image by a printer", "to present the image on the display", "to transmit the image by a facsimile" and "to store the image in a data base".

FIG. 2 is a flowchart showing a processing example according to this exemplary embodiment. Step S210 to step S224 show processes to the image A and step S230 to step S244 show processes to the image B. Since both the processes are the same processes, the processes to the image A (the processes from the step S210 to the step S224) will be described and an explanation of the processes to the image B will be omitted.

In step S212, the pre-process module 110 carries out the erecting process to the image A.

In step S214, the pre-process module 110 carries out a skew correction to the image A.

In step S216, the area extracting module 120 extracts the character areas from the respective pages of the image A pre-processed in the step S212 and the step S214. The area extracting module 120 may extract not only the character areas, but also the graphic areas.

Figure 4:
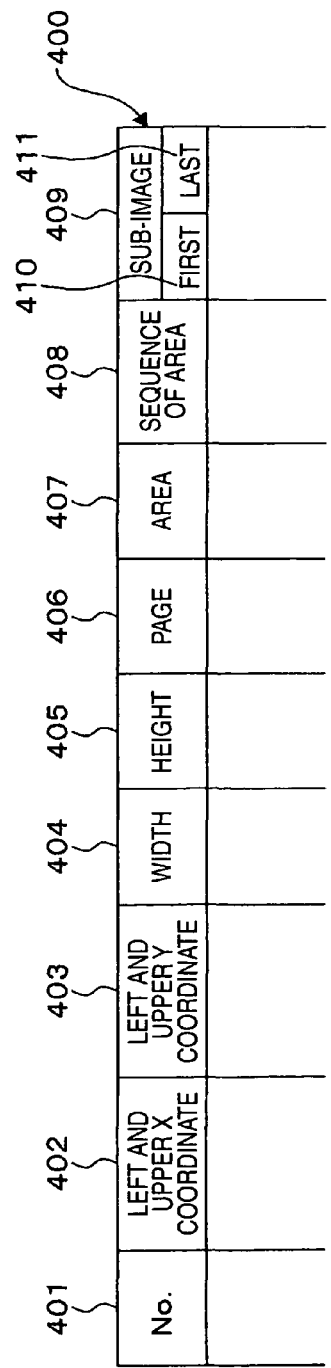
FIG. 4 is an explanatory view showing a data structural example of an area data table.

Here, referring to FIG. 4, an area data table 400 will be described for storing the extracted results of the character areas or the like. The area data table 400 includes a NO. column 401, a left and upper x coordinate column 402, a left and upper y coordinate column 403, a width column 404, a height column 405, a page column 406, an area column 407, an area sequence column 408 and a sub-image column 409. The sub-image column 409 includes a first column 410 and the last column 411.

The No. column 401 stores symbols for exclusively identifying the extracted areas.

The left and upper x coordinate column 402, the left and upper y coordinate column 403, the width column 404 and the height column 405 specify the area and respectively store an x coordinate and a y coordinate of a left and upper corner of a rectangular area in the page and the width and the height of the area. However, the columns do not need to be limited thereto and may store a left and upper coordinate and a right and lower coordinate.

The page column 406 stores the order of the pages in the image.

The area column 407 stores kinds of the areas (the character area, the graphic area, etc.). After step S218, processes are carried out only to the character areas as targets.

The area sequence column 408 stores a determined order to the character areas in the step S218.

The sub-image column 409 stores the sub-images located in the area. The first column 410 stores the symbol of the sub-image located in the first of the area that is illustrated in a No. column 501 of a sub-image data table 500 shown in an example of FIG. 5. The last column 411 similarly stores the symbol of the sub-image located in the last of the area that is illustrated in the No. column 501 of the sub-image data table 500 shown in the example of FIG. 5.

In the step S218, the area sequencing module 130 determines an order of the character areas in each page of the image A. The area sequence column 408 of the area data table 400 stores the result.

In step S220, the sub-image extracting module 140 extracts the sub-images from each page (the character areas) of the image A.

Figure 5:
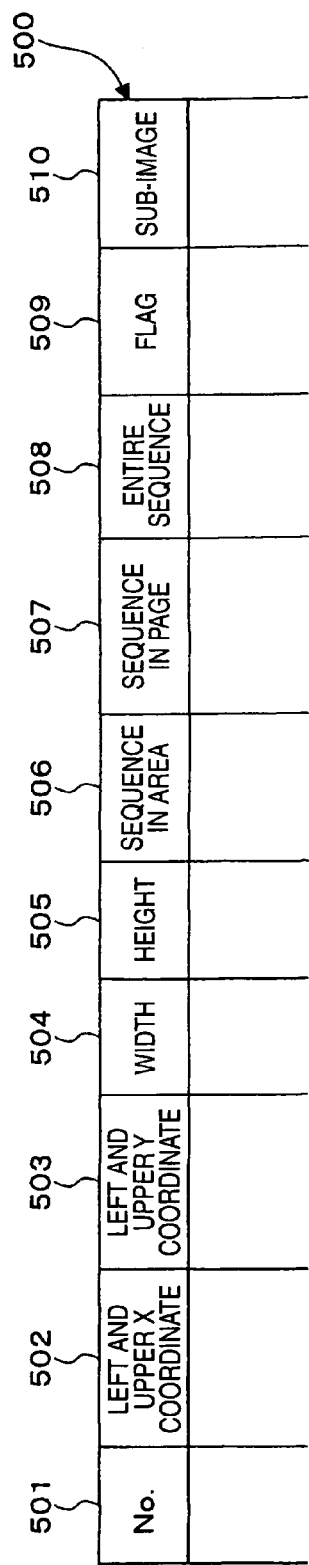
FIG. 5 is an explanatory view showing a data structural example of a sub-image data table.

Here, by referring to FIG. 5, the sub-image data table 500 will be described for storing the extracted results of the sub-images. The sub-image data table 500 includes a NO. column 501, a left and upper x coordinate column 502, a left and upper y coordinate column 503, a width column 504, a height column 505, a sequence in area column 506, a sequence in page column 507, an entire sequence column 508, a flag column 509 and a sub-image column 510.

The No. column 501 stores symbols for exclusively identifying the extracted sub-images.

The left and upper x coordinate column 502, the left and upper y coordinate column 503, the width column 504 and the height column 505 specify the sub-image and respectively store an x coordinate and a y coordinate of a left and upper corner of a rectangular area in the page and the width and the height of the area. However, the columns do not need to be limited thereto and may store a left and upper coordinate and a right and lower coordinate.

The sequence in area column 506 stores a result in step S222 (the order of the sub-images in the character area).

The sequence in page column 507 and the entire sequence column 508 store a result in step S224 (the order of the sub-images in the image).

The flag column 509 stores results in step S260, step S268 and step S270.

The sub-image column 510 stores the sub-images. Contents to be stored may be the sub-image themselves or links indicating where the sub-images are stored.

In the step S222, the sub-image sequencing module 150 determines an order of the sub-images in the character area. The obtained result is stored in the sequence in area column 506 of the sub-image data table 500.

In the step S224, the entire sequencing module 160 determines an order of the sub-images in the image A. Namely, when the plural character areas are present, the order of the sub-images is determined in accordance with the order in the step S218. When the plural pages are present, the order of the sub-images is determined in accordance with the order of the pages The obtained results are stored in the sequence in page column 507 and the entire sequence column 508 of the sub-image data table 500.

Processes from step S250 to step S270 are carried out by the collating module 170. In the step S250, the sub-images that are not collated yet are sequentially collated with the sub-images in the image A and the image B in accordance with the results respectively sorted in the step S224 and the step S244. Namely, in accordance with the determined order of the sub-images in the images respectively, a collating process is carried out between the sub-images. Though the sub-images having the same order are not constantly collated with each other, they are collated with each other in accordance with the order respectively. Then, when the collating processes of all the sub-images are completed, the procedure advances to step S272. A detail of the collating process will be described below by referring to FIG. 3.

In step S252, as a result of the collating process in the step S250, it is decided whether or not the two sub-images are the same. In this decision, when it is decided that the two sub-images are the same (Y), the procedure returns to the step S250. Otherwise (N), the procedure advances to step S254. In this case, the same includes not only that there is no difference between the sub-images, but also that the difference is located within a prescribed range (the rest is the same).

In the step S254, the sub-image of the image A that does not correspond to the sub-image of the image B and N sub-image columns in total (N is an integer of 0 or more) subsequent thereto are noticed. That is, the sub-image columns are set as fixed targets to be collated in step S256.

In the step S256, in the sub-images of the image B, sub-image columns corresponding to the noticed sub-image columns of the step S254 are collated after the sub-image that does not correspond to the sub-image of the image A.

In step S258, as a result of the collating process of the step S256, it is decided whether the sub-image columns correspond to each other in the two sub-image columns (the noticed sub-image columns of the image A and the sub-image columns of the image B) In this decision, when it is decided that the sub-image columns correspond to each other (Y), the procedure advances to step S260. Otherwise (N), the procedure advances to step S262. In this case, to correspond to each other includes not only that there is no difference between the sub-image columns, but also that the difference is located within a prescribed range (the rest is the same).

In the step S260, in the sub-images of the image B, an "insertion" flag is attached to the sub-image columns up to the corresponding position. That is, since it is recognized that the same sub-image columns as the noticed sub-image columns of the image A are present in the image B, the sub-images of the image B provided up to that corresponding position are inserted sub-images as compared with the image A. This result is stored in the flag column 509 of the sub-image data table 500.

Step S262 and step S264 are processes reverse to the processes of the step 254 and the step 256. That is, in the step S254 and the step S256, the sub-images of the image A are fixed and collated, however, in the step S262 and the step S264, the sub-images of the image B are fixed and collated.

In the step S262, the sub-image of the image B that does not correspond to the sub-image of the image A and N sub-image columns in total subsequent thereto are noticed. That is, the sub-image columns are set as fixed objects to be collated in the step S264.

In the step S264, in the sub-images of the image A, sub-image columns corresponding to the noticed sub-image columns of the step S262 are collated after the sub-image that does not correspond to the sub-image of the image B.

In step S266, as a result of the collating process of the step S264, it is decided whether the sub-image columns correspond to each other in the two sub-image columns (the sub-image columns of the image A and the noticed sub-image columns of the image B). In this decision, when it is decided that the sub-image columns correspond to each other (Y), the procedure advances to step S268. Otherwise (N), the procedure advances to step S270.

In the step S268, in the sub-images of the image A, a "deletion" flag is attached to the sub-image columns up to the corresponding position. That is, since it is recognized that the same sub-image columns as the noticed sub-image columns of the image B are present in the image A, the sub-images of the image A provided up to that corresponding position are deleted sub-images as compared with the image B. This result is stored in the flag column 509 of the sub-image data table 500.

In the step S270, "change" flags are respectively attached to the first sub-image column of the noticed sub-image columns of the image A and the image B. Namely, since it is recognized that each of the noticed sub-image columns does not exist in the other image, the first of the noticed sub-image columns is determined to be changed. This result is stored in the flag column 509 of the sub-image data 500.

In the step S272, the processing module 180 processes the positions of the sub-images decided to be "deleted", "inserted" and "changed" in the processes from the step S250 to the step S270. Namely, in accordance with the flag column 509 of the sub-image data table 500, the processing module 180 processes the positions of the corresponding sub-images (the left and upper x coordinate column 502 to the height column 505 of the sub-image data table 500).

Figure 3:
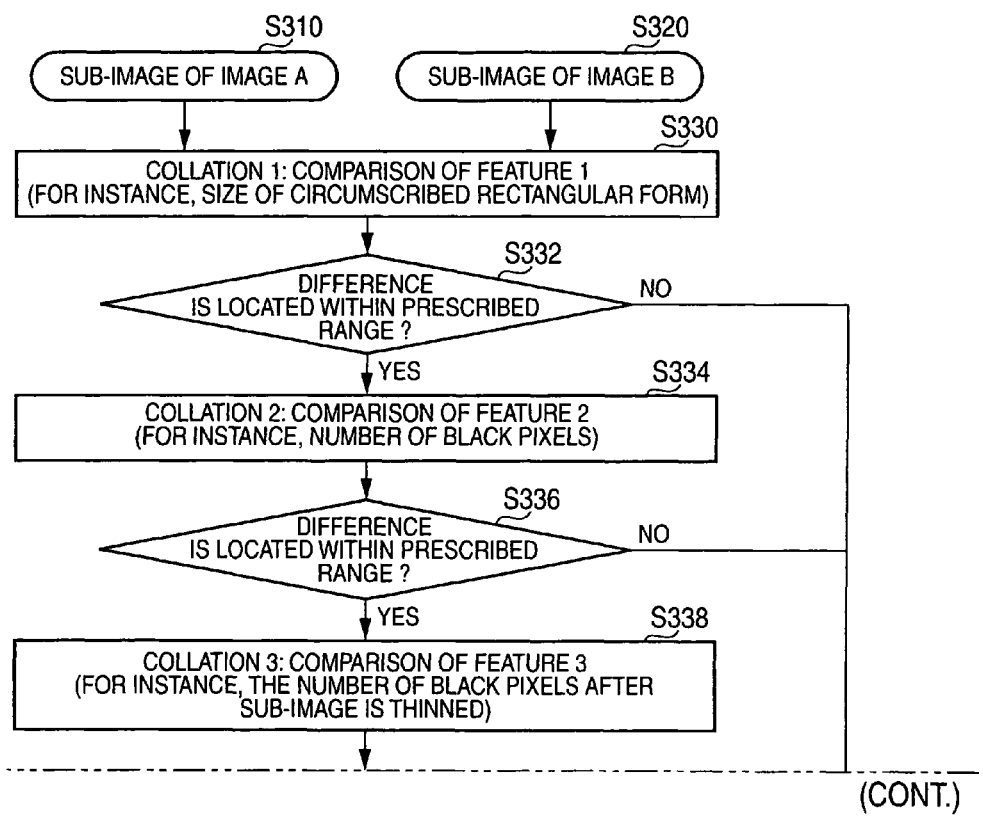
FIG. 3 is a flowchart showing an example of a collating process of sub-images according to the exemplary embodiment.

FIG. 3 is a flowchart showing an example of the collating process of the sub-images according to this exemplary embodiment. That is, the collating process of the step S250 in the flowchart shown in FIG. 2 is represented and carried out by the collating module 170.

In step S310, the sub-images of the image A are received. In step S320, the sub-images of the image B are received. Namely, the sub-images of both the images to be compared with each other are received.

In step S330, features 1 of the sub-images of both the images (for instance, the size of the circumscribed rectangular form of the sub-image, more specifically, the width column 504 and the height column 505 of the sub-image data table 500) are compared with each other.

In step S332, it is decided whether or not a compared result in the step S330, that is, the difference is located within a prescribed range. In this decision, when the difference is located within the prescribed range (Y) the procedure advances to step S334. Otherwise (N), the procedure advances to step S348.

In the step S334, features 2 of the sub-images of both the images (for instance, the number of black pixels of the sub-image) are compared with each other.

In step S336, it is decided whether or not a compared result in the step S334, that is, the difference is located within a prescribed range. In this decision, when the difference is located within the prescribed range (Y), the procedure advances to step S338. Otherwise (N), the procedure advances to the step S348.

In the step S338, features 3 of the sub-images of both the images (for instance, the number of the black pixels after the sub-image is thinned) are compared with each other. Here, employing the thinned sub-image reduces the influence based on a face or a density when the sub-image is read by a scanner.

In step S340, it is decided whether or not a compared result in the step S338, that is, the difference is located within a prescribed range. In this decision, when the difference is located within the prescribed range (Y) the procedure advances to step S342. Otherwise (N), the procedure advances to the step S348.

In the step S342, features 4 of the sub-images of both the images (for instance, a correlation coefficient value after a pattern matching between the sub-images, more specifically, the number of pixels representing one after an EOR calculation between the two sub-images) are compared with each other.

In step S344, it is decided whether or not a compared result in the step S342, that is, the difference is located within a prescribed range. In this decision, when the difference is located within the prescribed range (Y) the procedure advances to step S346. Otherwise (N), the procedure advances to the step S348.

In the step S346, it is decided that the targeting sub-image of the image A corresponds to the targeting sub-image of the image B. That is, in the flowchart shown in FIG. 2, a case of Y in the step S252 is obtained.

In the step S348, it is decided that the targeting sub-image the image A does not correspond to the targeting sub-image of the image B. That is, in the flowchart shown in FIG. 2, a case of N in the step S252 is obtained.

In the process example shown in FIG. 3, the comparing processes of four stages are performed in order from the process of a relatively small load in the comparing process, so that a process having a large load may not be carried out to the sub-images that do not correspond. As for the number of stages of the comparing processes, a larger number of comparing processes may be performed (for instance, a process equivalent to a process for extracting features used in the character recognizing process is carried out and a process for comparing results thereof with each other is added) or a smaller number of comparing processes may be carried out. Further, features to be compared are not limited to the examples described above and other features may be used.

Figure 6:
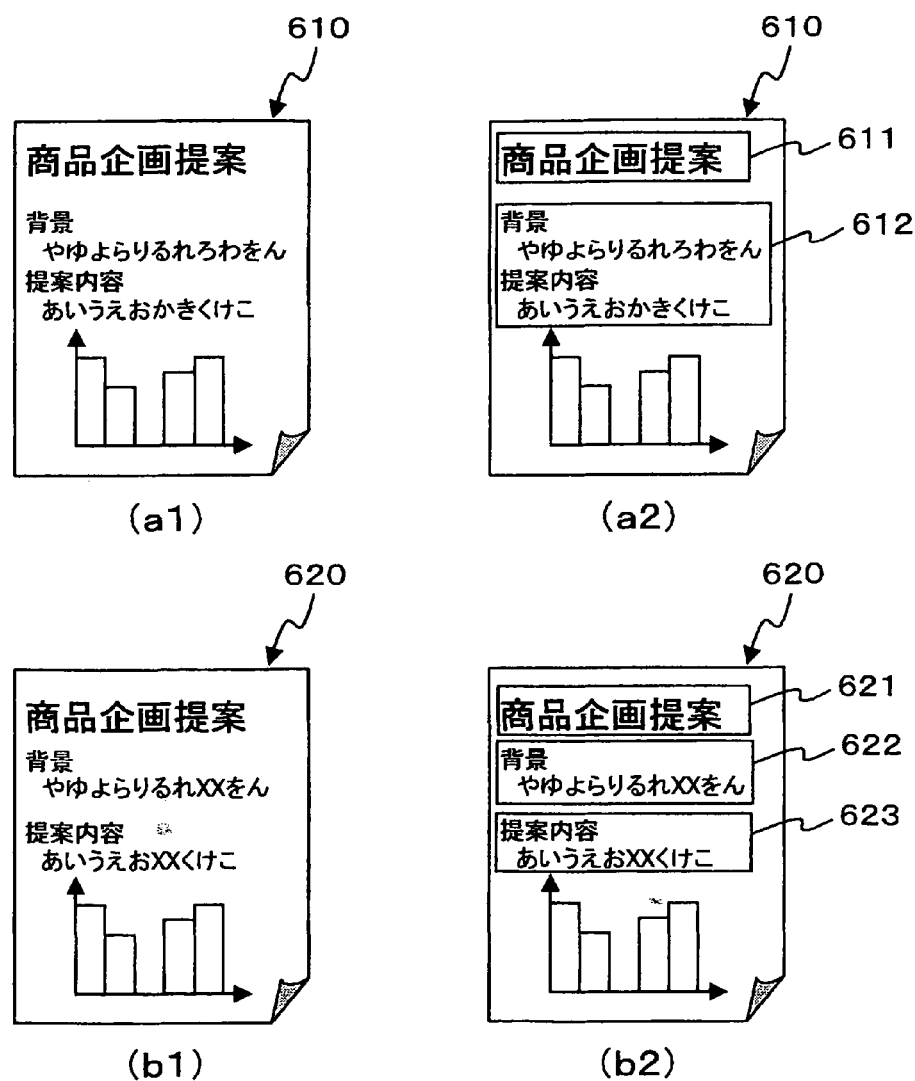
FIG. 6 is an explanatory view showing a process example of a case 1 according to the exemplary embodiment.
Figure 7:
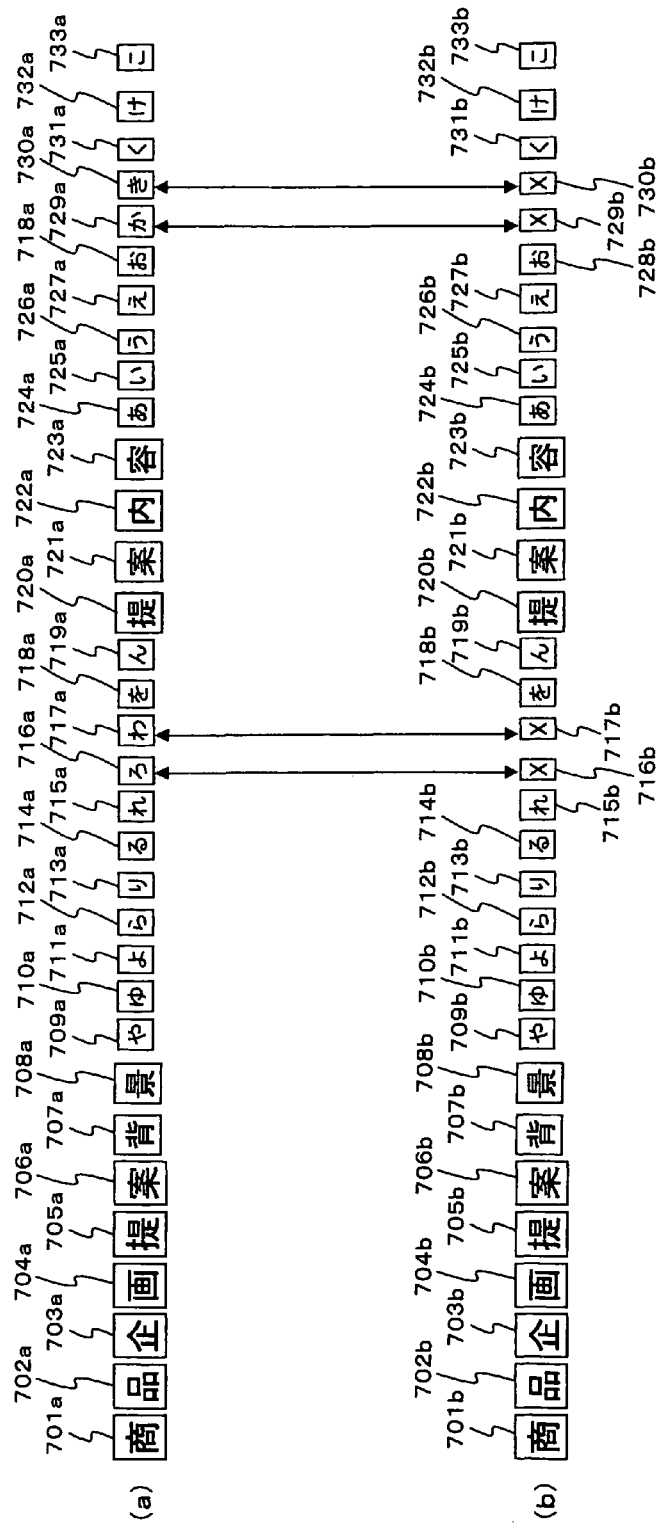
FIG. 7 is an explanatory view showing a process example of the case 1 according to the exemplary embodiment.
Figure 8:
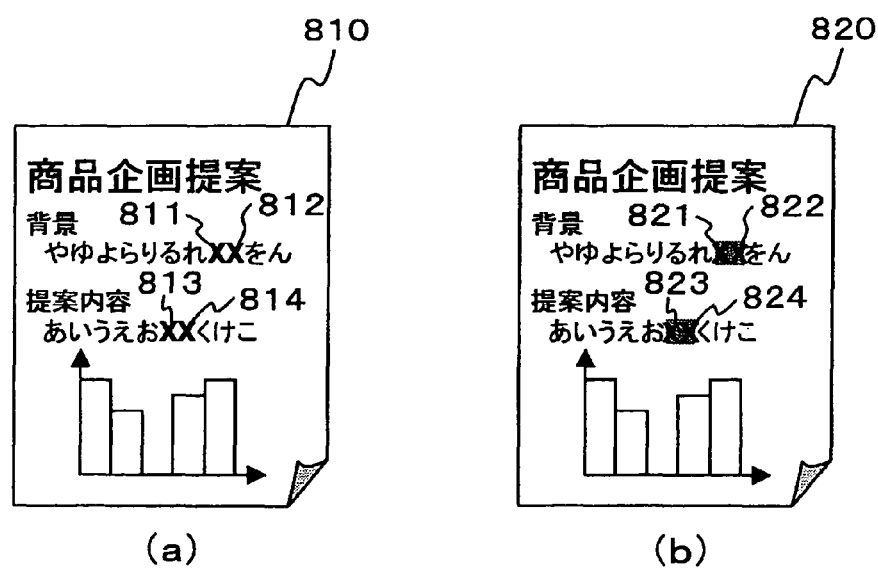
FIG. 8 is an explanatory view showing a process example of the case 1 according to the exemplary embodiment.

FIG. 6, FIG. 7 and FIG. 8 are explanatory views showing process examples of a case 1 according to this exemplary embodiment.

(a1) in FIG. 6 and (b1) in FIG. 6 show an image 610 as the image A and an image 620 as the image B. Namely, the image 620 is obtained by changing spaces between lines of the image 620 and partly changing characters. In this case, when the entire part of the image 610 is aligned with the entire part of the image 620 to extract the difference as the image, since the spaces between the lines are different between the image 610 and the image 620, all the parts under the part 611 are decided to be different.

The image 610 and the image 620 shown (a2) in FIG. 6 and (b2) in FIG. 6 show extracted results by the area extracting module 120. That is, the image 610 is determined to have a character area 611 and a character area 612, and the image 620 is determined to have a character area 621, a character area 622 and a character area 623. The above-described problem arises, because the spaces between the lines are different between the image 610 and the image 620.

Then, the order of the areas of the image 610 is set in order of the character areas 611 and 612, and the order of the image 620 is set in order of the character areas 621, 622 and 623 by the area sequencing module 130.

FIG. 7 shows the processed results of the image 610 and the image 620 that are processed by the sub-image extracting module 140, the sub-image sequencing module 150, the entire sequencing module 160 and the collating module 170. Specifically, the sub-images (characters) extracted by the sub-image extracting module 140 are shown to be enclosed by rectangular forms and arranged based on the order determined by the sub-image sequencing module 150 and the entire sequencing module 160 (from a sub-image 701*a* to a sub-image 733*a*, from a sub-image 701*b* to a sub-image 733*b*). That is, even when the character areas are divided into two parts, the orders of the sub-images are set throughout the areas. The ordered sub-images are collated by the collating module 170. Namely, in accordance with the orders of the sub-images respectively, the corresponding sub-images (that is, the sub-image 701*a* and the sub-image 701*b*, . . . ) are compared with each other. As a result, it is decided that the sub-images 701*a* to 715*a* respectively correspond to the sub-images 701*b* to 715*b*. Namely, in the flowchart shown in FIG. 2, the step S250 and the step 252 are repeated. Then, it is decided that the sub-image 716*a* does not correspond to the sub-image 716*b* to carry out the processes of the steps S254, S256, S258, S262, S264, S266 and S270. Then, the sub-image 716*a* is determined to be changed to the sub-image 716*b*. Similarly, it is determined that the sub-image 717*a* and the sub-image 717*b*, the sub-image 729*a* and the sub-image 729*b* and the sub-image 730*a* and the sub-image 730*b* are "change".

FIG. 8 shows an example in which the processing module 180 processes the sub-images (the sub-images 716*b*, 717*b*, 729*b*, and 730*b*) in the positions decided to be "change" in the image 620 (the image B). For instance, in an image 810 shown in (a) of FIG. 8, the sub-images (characters 811, 812, 813 and 814) located in the positions are shown to be thickened. Further, in an image 820 shown in (b) of FIG. 8, the backgrounds of the sub-images (processed characters 821, 822, 823 and 824) located in the positions are colored.

FIGS. 9 to 15 are explanatory views showing process examples of a case 2 according to this exemplary embodiment. The case 2 shows that the images respectively have a plurality of pages and an insertion and a deletion are carried out.

Figure 9:
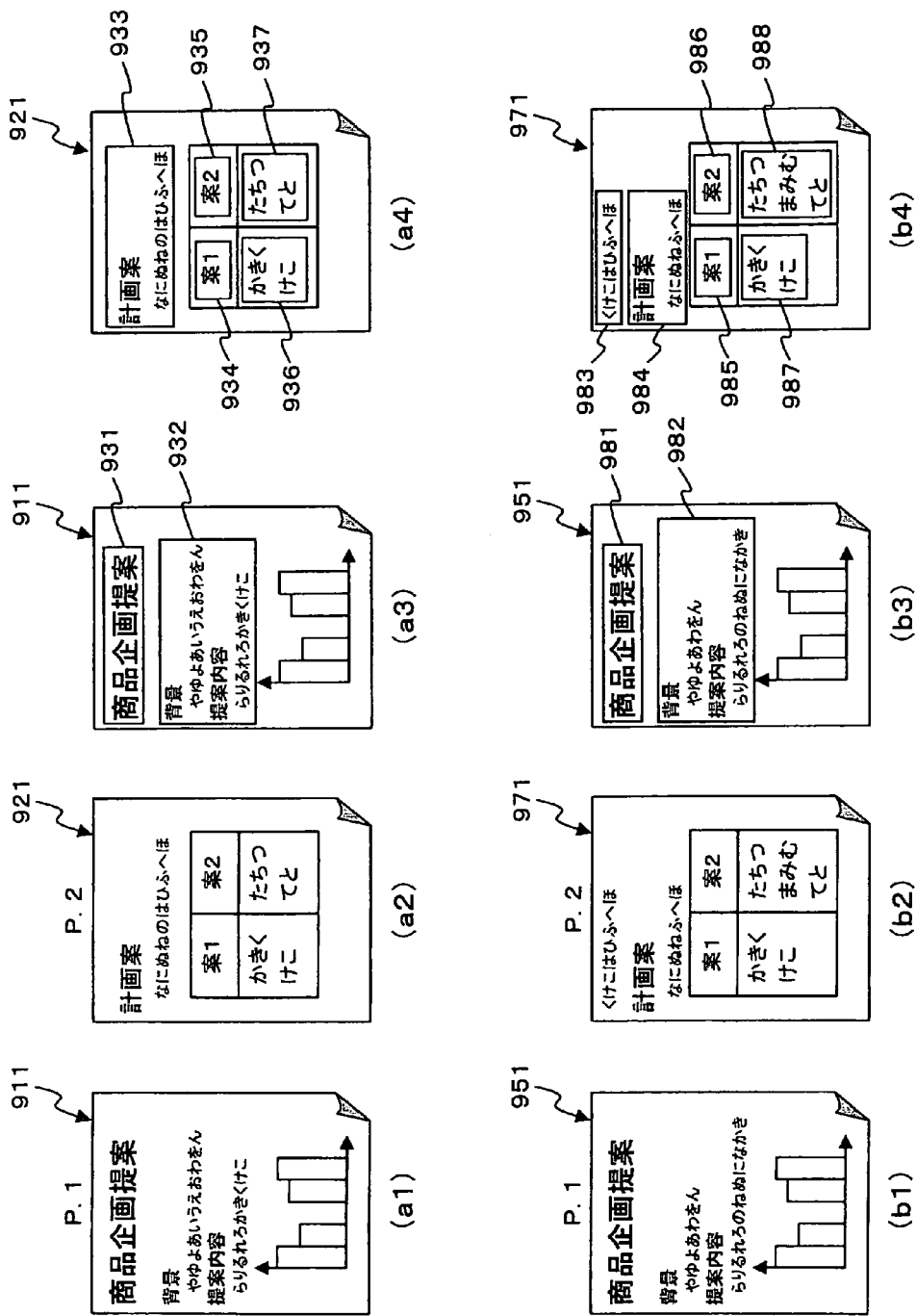
FIG. 9 is an explanatory view showing a process example of a case 2 according to the exemplary embodiment.

(a1) and (a2) in FIG. 9 exemplify images 911 and 921 as the image A, and (b1) and (b2) in FIG. 9 exemplify images 951 and 971 as the image B. That is, in the image B, characters are inserted and a character string of a preceding page partly protrudes to the image 971.

Images 911 and 921, and images 951 and 971 shown in (a3), (a4), (b3) and (b4) in FIG. 9 show the extracted results by the area extracting module 120. Namely, the image 911 is determined to have character areas 931 and 932, the image 921 is determined to have character areas 933 to 937, the image 951 is determined to have character areas 981 and 982 and the image 971 is determined to have character areas 983 to 988.

Then, by the area sequencing module 130, the order of the areas of the image 911 is set in order of the character areas 931 and 932. The order of the areas of the image 921 is set in order of the character areas 933, 934, 935, 936, and 937. The order of the areas of the image 951 is set in order of the character areas 981 and 982. The order of the areas of the image 971 is set in order of the character areas 983, 984, 985, 986, 987 and 988.

(a) and (b) in FIG. 10 show the processed results of the images 911 and 921 of the image A and the images 951 and 971 of the image B that are processed by the sub-image extracting module 140, the sub-image sequencing module 150, the entire sequencing module 160. Specifically, the sub-images (characters) extracted by the sub-image extracting module 140 are shown to be enclosed by rectangular forms and arranged based on the order determined by the sub-image sequencing module 150 and the entire sequencing module 160 (60 sub-images in the image A, 66 sub-images in the image B). That is, even when there are a plurality of images and a plurality of areas, the orders of the sub-images are set throughout the pages and the areas.

Figure 11:
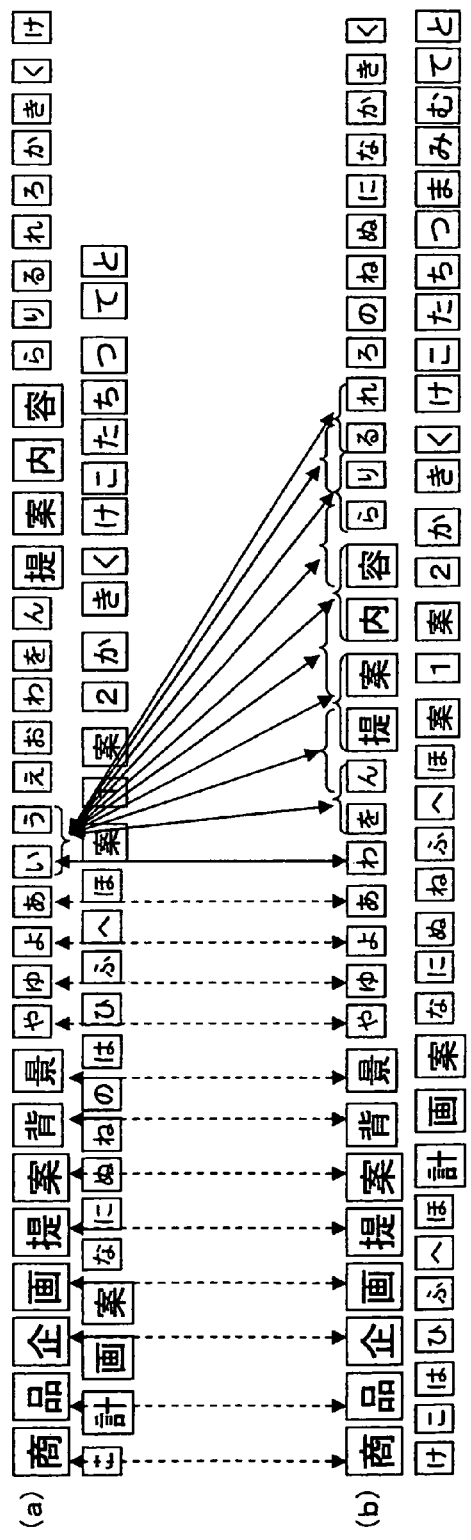
FIG. 11 is an explanatory view showing a process example of the case 2 according to the exemplary embodiment.

(a) and (b) in FIG. 11 show an intermediate part of a process by the collating module 170 (in the flowchart shown in FIG. 2, the steps S250 to S258). Namely, in the steps S250 and S252, it is decided that the 12 sub-images correspond to each other between the image A and the image B. Then, in the flowchart shown in FIG. 2, when N is supposed to be 1 in the step S254, that is, the two sub-image columns (13th and 14th sub-images) of the image A are supposed to be the noticed sub-image columns, the noticed sub-image columns are searched from the sub-image columns after that in the image B (after a 13th sub-image) (step S256). In this case, since there is no corresponding sub-image column, the procedure advances to the step S262. In FIGS. 11 to 14, as a result of comparison, the corresponding sub-images are shown by arrow marks of dotted lines and the sub-images that do not correspond are shown by arrow marks of full lines.

Figure 12:
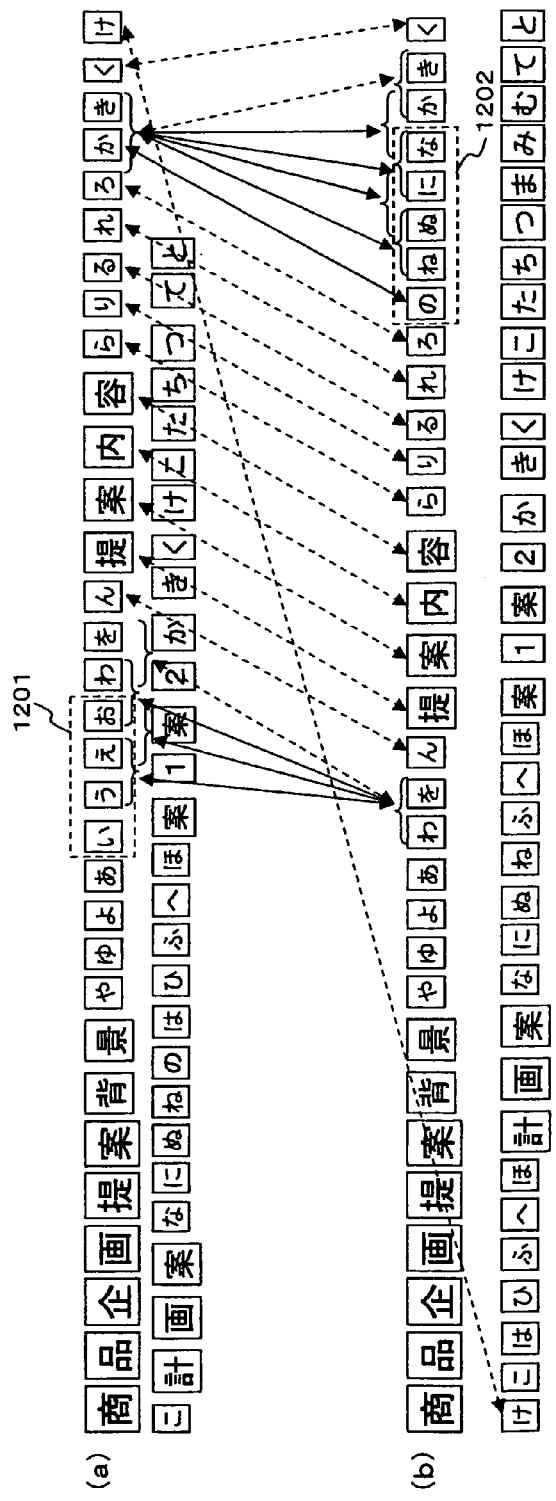
FIG. 12 is an explanatory view showing a process example of the case 2 according to the exemplary embodiment.

(a) and (b) in FIG. 12 show an intermediate part of a process by the collating module 170 (in the flowchart shown in FIG. 2, the steps S250 to S268, that is, a process for deciding the "insertion" and the deletion"). In the step S262, the two sub-image columns of the image B (the 13th sub-image and a 14th sub-image) are supposed to be the noticed sub-image columns, and the noticed sub-image columns are searched from the sub-image columns after that in the image A (after the 13th sub-image) (step S264). In this case, since the corresponding sub-image is a 17-th sub-image column (17th and 18th sub-images), the procedure advances to the step S268. In the step S268, the sub-image (the 13th sub-image) in the image A determined not to correspond to the noticed sub-image columns through the sub-image (a 16th sub-image) immediately before the sub-image decided to correspond to the noticed sub-image columns are determined to be deleted sub-images 1201.

Then, since the 17th sub-image to a 28th sub-image of the image A correspond to the 13th sub-image to a 24th sub-image of the image B to each other, the processes of the steps S250 and S252 are repeated.

Then, since a 29th sub-image of the image A do not correspond to a 25th sub-image of the image B, the 29th and 30th sub-image columns of the image A are supposed to be the noticed sub-image columns and the noticed sub-columns are searched from the sub-image columns after that in the image B (from a 26th sub-image). In this case, since the corresponding sub-image is a 30th sub-image column (30th and 31st sub-images), the procedure advances to the step S260. In the step S260, the sub-image (the 25th sub-image) in the image B decided not to correspond to the noticed sub-image columns of the image A to the sub-image (a 29th sub-image) immediately before the sub-image decided to correspond to the noticed sub-image columns of the image A are decided to be inserted sub-images 1202.

Then, a 31st sub-image of the image A is decided to correspond to a 32nd sub-image of the image B and the processes are continuously carried out.

Figure 13:
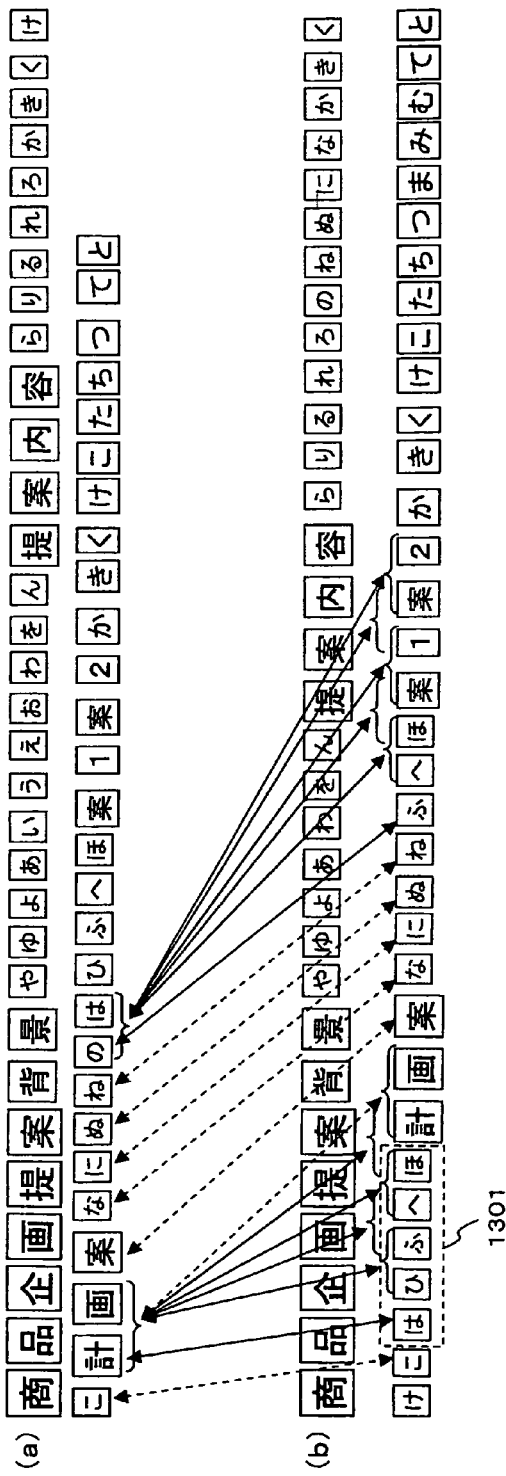
FIG. 13 is an explanatory view showing a process example of a case 2 according to the exemplary embodiment.

(a) and (b) in FIG. 13 show a state that the processes are similarly repeated to determine inserted sub-images 1301 from the image B, and then, the sub-images corresponding to the noticed sub image columns (41st and 42nd sub-images) of the image A cannot be found from the sub-image columns of the image B after that.

Figure 14:
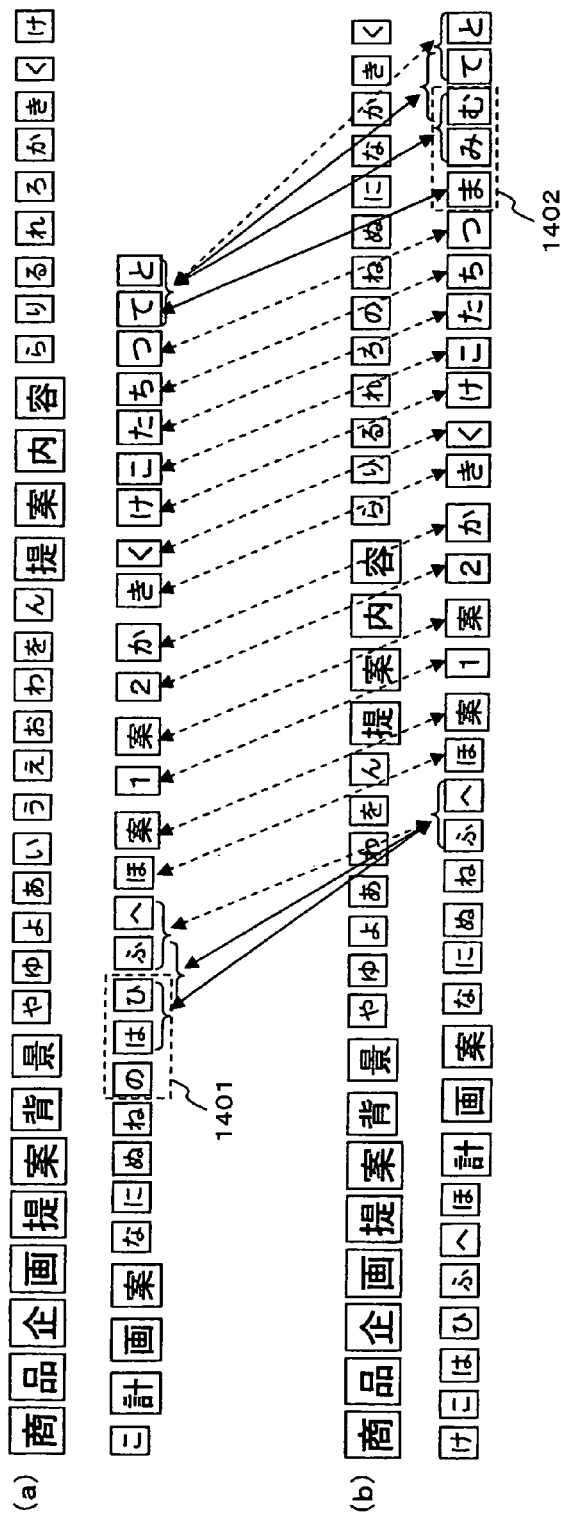
FIG. 14 is an explanatory view showing a process example of the case 2 according to the exemplary embodiment.

(a) and (b) in FIG. 14 show a result obtained by repeating the similar processes to determine deleted sub-images 1401 from the image A and to determine inserted sub-images 1402 form the image B.

Briefly stated, as the difference between the image A and the image B, the deleted sub-images 1201 and 1401 and the inserted sub-images 1202, 1301 and 1402 are determined.

FIG. 15 shows examples that the processing module 180 processes the positions of the sub-images determined to be "deleted" and "inserted" in the images 951 and 971 (the image B) (deleted sub-images 1201, 1401, inserted sub-images 1202, 1301, 1401).

For instance, in the "deleted" parts of the sub-images shown in (a1) and (a2) of FIG. 15, one sub-images respectively before and after the sub-image are thickened and colors of them are changed (characters 1511 and 1512, characters 1523 and 1524). Then, in the "inserted" parts of the sub-images, the sub-images are bolded and colors thereof are changed (different colors from those of "deletion") (characters 1513 to 1517, characters 1518 to 1522).

Further, in the "deleted" parts of the sub-images shown in (b1) and (b2) of FIG. 15, one sub-images respectively before and after the sub-image are bolded and colors of backgrounds are changed (processed characters 1531, processed characters 1534). Then, in the "inserted" parts of the sub-images, the sub-images are bolded and colors of backgrounds are changed (different colors from "deletion") (processed characters 1532, processed characters 1533, processed characters 1535).

Further, in the sub-images shown in (c1) and (c2) in FIG. 15, symbols (♦) are attached to positions corresponding to the "deleted" parts (processed images 1541, 1552). Then, in the "inserted parts" of the sub-images, the sub-images are bolded and colors thereof are changed (different color from the symbols of "deletion") (characters 1542 to 1546, characters 1547 to 1551, characters 1553 to 1555).

Figure 16:
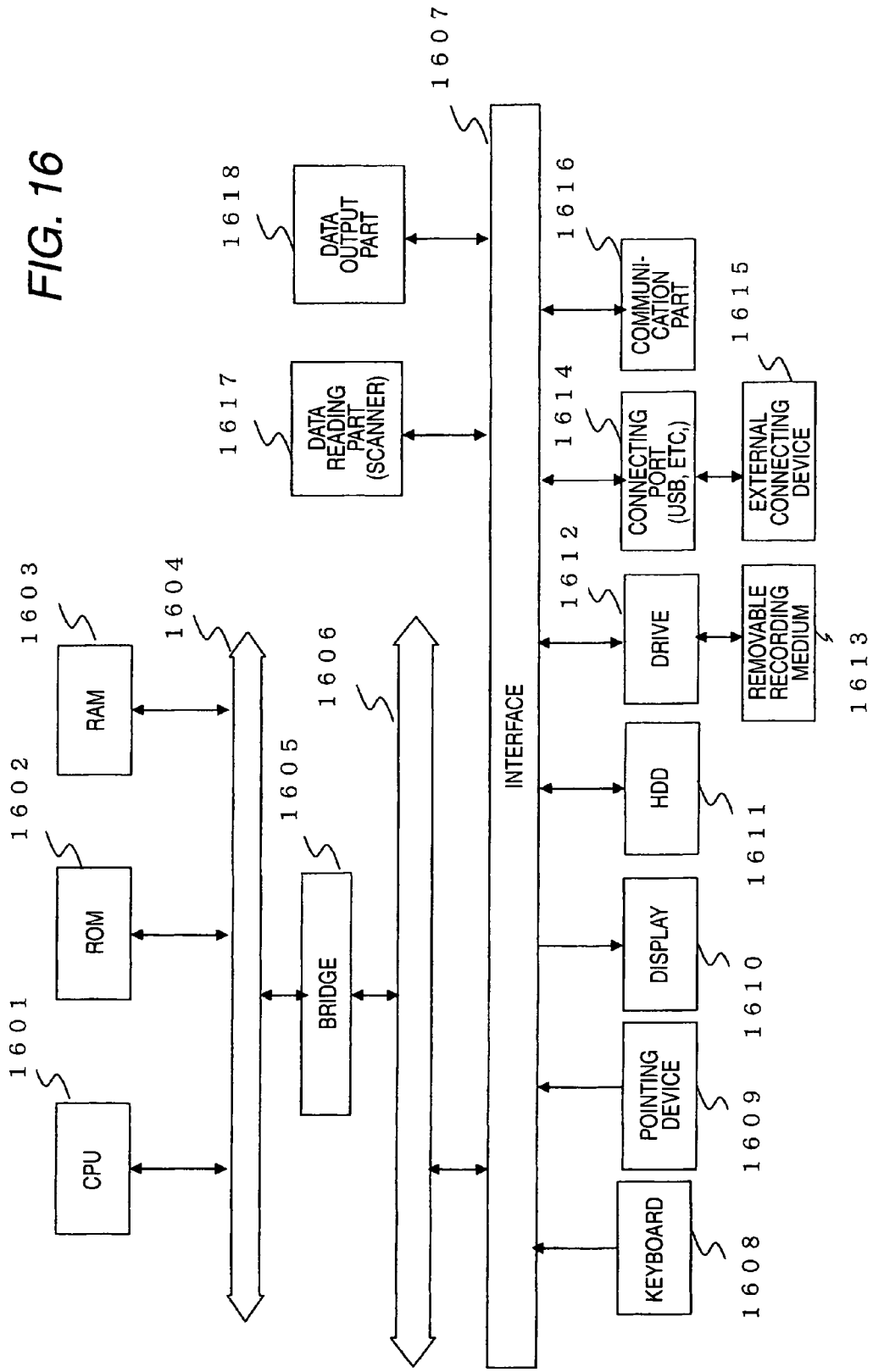
FIG. 16 is a block diagram of a hardware structural example of a computer for realizing the exemplary embodiment.

Referring to FIG. 16, a hardware structural example of this exemplary embodiment will be described below. A structure shown in FIG. 16 is formed with, for instance, a personal computer (PC) and illustrates the hardware structural example including a data reading part 1617 such as a scanner and a data output part 1618 such as a printer.

A CPU (Central Processing Unit) 1601 is a control part for executing processes according to computer programs that respectively describe executing sequences of the various kinds of modules described in the above-described exemplary embodiment, that is, the area extracting module 120, the area sequencing module 130, the sub-image extracting module 140, the sub-image sequencing module 150, the entire sequencing module 160 and the collating module 170.

A ROM (Read Only memory) 1612 stores programs or calculating parameters or the like used by the CPU 1601. A RAM (Random Access Memory) 1603 stores programs used in the execution of the CPU 1601 or parameters suitably changing in the execution thereof. These members are mutually connected by a host bus 1604 formed with a CPU bus.

The host bus 1604 is connected to an external bus 1606 such as a PCI (Peripheral Component Interconnect/Interface) bus through a bridge 1605.

A pointing device 1609 such as a keyboard 1608, a mouse, etc. is an input device operated by an operator. A display 1610 is composed of a liquid crystal display device or a CRT (Cathode Ray Tube) or the like to display various kinds of information as a text or image information.

An HDD (Hard Disk Drive) 1611 incorporates a hard disk therein and drives the hard disk to record or reproduce the programs or information executed by the CPU 1601. In the hard disk, the received image or the image processed by the processing module 180 or the like is stored. Further, various kinds of computer programs such as other various kinds of data processing programs are stored.

A drive 1612 reads data or programs recorded in a removable recording medium 1613 such as a mounted magnetic disk, an optical disk, a photo-electro-magnetic disk or a semiconductor memory to supply the data or the programs to the RAM 1603 connected through an interface 1607, the external bus 1606, the bridge 1605 and the host bus 1604. The removable recording medium 1613 can be also used as a data recording area like the hard disk.

A connecting port 1614 is a port for connecting an external connecting device 1615 and has a connecting part such as a USB, an IEEE 1394, etc. The connecting port 1614 is connected to the CPU 1601 through the interface 1607, and the external bus 1606, the bridge 1605 and the host bus 1604. A communication part 1616 is connected to a network to execute a data communication process with an external part. The data reading part 1617 is, for instance, the scanner to execute a reading process of a document. The data output part 1618 is, for instance, the printer to execute an output process of document data.

The hardware structure shown in FIG. 16 illustrates one structural example, and the exemplary embodiment of the present invention is not limited to the structure shown in FIG. 16. Any structure that can execute the modules described in the exemplary embodiment may be used. For instance, a part of the modules may be formed with an exclusive hardware (for instance, Application Specific Integrated Circuit: ASIC) or the like. A part of the modules may be located in an external system and connected by a communication line. Further, a plurality of the systems shown in FIG. 16 may be connected together by the communication line to mutually cooperate. Further, the structure shown in FIG. 16 may be incorporated in a copying machine, a facsimile device, a scanner, a printer, a multi-function machine (an image processor having two or more functions of the scanner, the printer, the copying machine, the facsimile device, etc.) or the like.

According to the above-described exemplary embodiment, in the flowchart shown in FIG. 2, in the processes after the step S250, the examples of the processes are shown for determining the "insertion", the "deletion" and the "change". However, when it is previously known that the processes include only the "change", or when the insertion and the deletion are determined also as the change (that is, after the insertion and the deletion, all the processes are set to changes) in the processes after the step S250, both the sub-images may be collated with each other in order sorted in the step S224 and the step S244, a flag may be attached to the different sub-image and the position of the sub-image decided to be different may be processed.

Further, in the above-described exemplary embodiment, the example is shown that the processing module 180 carries out a process on the basis of the image B, however, the processing module 180 may carries out a process on the basis of the image A. Further, the processing module 180 may process both the images. Namely, for the image A, the processing module 180 may process the deleted part, and for the image B, the processing module 180 may process the inserted part. For the changed part, the processing module 180 may process one or both of the images.

Further, for the collating process carried out by the collating module 170, a collating process used in a character string (a text string) may be applied as well as the above-described collating process.

The above-described program may be stored and provided in a recording medium. Further, the program may be provided by a communication unit. In this case, the above-described program may be taken as the invention a "computer readable medium storing a program".

The "computer readable medium storing a program" means a recording medium having a program recorded that can be read by a computer, which is employed for installing and executing the program and circulating the program.

As the recording medium, are exemplified, for instance, a digital versatile disk (DVD) such as "DVD-R, DVD-RW, DVD-RAM, etc." as a standard established in a DVD forum, "DVD+R, DD+RW, etc." as a standard established by a DVD+RW, a compact disk (CD) such as a read only memory (CD-ROM), a CD recordable (CD-R), a CD rewritable (CD-RW), etc., a photo-electro-magnetic disk (MO), a flexible disk (FD), a magnetic tape, a hard disk, a read only memory (ROM), an electrically erasable and rewritable read only memory (EEPROM), a flash memory, a random access memory (RAM), etc.

The above-described program or a part thereof may be recorded and stored in the recording medium and circulated. Further, the program may be transmitted through a communication by using, for instance, a local area network (LAN), a metropolitan area network (MAN), a wide area network (WAN), a wired network or a radio communication network employed for an internet, an intranet, an extra network, and a transmitting medium such as a combination of them, or may be transmitted by a carrier wave.

Further, the above-described program may be a part of other program or stored in a recording medium together with a separate program. Further, the program may be divided and stored in a plurality of recording media. Further, the program may be recorded in any form such as compression or encoding, etc., if the program can be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processor comprising:
   a partial image extracting unit that extracts first partial images from a first image, and extracts second partial images from a second image;
   a sequencing unit that determines an order of the extracted first partial images in accordance with positions of the first partial images in the first image, and determines an order of the extracted second partial images in accordance with positions of second partial images in the second image; and
   a difference extracting unit that compares each first partial image with the corresponding second partial image in accordance with the order of the first partial images and the order of the second partial images, and extracts a difference based on the comparison between the first image and the second image.

2. The image processor according to claim 1, wherein
   the first image and the second image respectively have a plurality of pages,
   the sequencing unit determines the order of the first partial images throughout the plurality of pages in accordance with an order of the pages of the first image, and
   the sequencing unit determines the order of the second partial images through the plurality of pages in accordance with an order of the pages of the second image.

3. The image processor according to claim 1, wherein
   each comparison is performed by using a feature of each first partial image and a feature of the corresponding second partial image, and
   each comparison is performed in accordance with the orders determined by the sequencing unit.

4. The image processor according to claim 1, further comprising:
   an image processing unit that adds new information into at least one of the first image and the second image at the position of each first or second partial image having the difference extracted by the difference extracting unit.

5. The image processor according to claim 1, further comprising:
   an output unit that outputs an image presenting a position of the difference between the first image and the second image.

6. An image processor comprising:
   a storing unit that stores information about first partial images in a first image, wherein an order of the first partial images is determined in accordance with positions of the first partial images extracted from the first image;
   a partial image extracting unit that extracts second partial images from a second image;
   a sequencing unit that determines an order of the extracted second partial images in accordance with positions of the second partial images in the second image; and
   a difference extracting unit that compares each first partial image with the corresponding second partial image in accordance with the stored information of the first partial image and the order of the second partial image and extracts a difference based on the comparison between the first image and the second image.

7. The image processor according to claim 6, wherein
   the first image and the second image respectively have a plurality of pages,
   the information about the first partial images includes the order determined throughout the plurality of pages, and
   the sequencing unit determines the order of the second partial image throughout the plurality of pages in accordance with an order of the pages of the second image.

8. The image processor according to claim 6, wherein
   the information includes a feature of each first partial image,
   each comparison is performed by using the stored feature of each first partial image and a feature of each second partial image and
   each comparison is performed in accordance with the order of the first partial image stored by the storing unit and the order of the second partial image determined by the sequencing unit.

9. The image processor according to claim 6, further comprising:
   an output unit that outputs an image presenting a position of the difference between the first image and the second image.

10. A non-transitory computer readable medium storing a program causing a computer to execute a process for image processing, the process comprising:

extracting first partial images from a first image;
extracting second partial images from a second image;
determining an order of the extracted first partial images in accordance with positions of the first partial images in the first image;
determines an order of the extracted second partial images in accordance with positions of second partial images in the second image;
comparing each first partial image with the corresponding second partial image in accordance with the order of the first partial images and the order of the second partial images; and
extracting a difference based on the comparison between the first image and the second image.

11. The non-transitory computer readable medium 10, the process further comprising:
outputting an image presenting a position of the difference between the first image and the second image.

12. A non-transitory computer readable medium storing a program causing a computer to execute a process for image processing, the process comprising:
storing information about first partial images in a first image, wherein an order of the first partial images is determined in accordance with positions of the first partial images extracted from the first image;
extracting second partial images from a second image;
determining an order of the extracted second partial images in accordance with a positions of the second partial image in the second image;
comparing each first partial image with the corresponding second partial image in accordance with the stored information of the first partial image and the order of the second partial image; and
extracting a difference based on the comparison between the first image and the second image.

13. The non-transitory computer readable medium 12, the process further comprising:
an output unit that outputs an image presenting a position of the difference between the first image and the second image.

* * * * *